US010523971B1

(12) United States Patent
Masek et al.

(10) Patent No.: US 10,523,971 B1
(45) Date of Patent: Dec. 31, 2019

(54) DISTRIBUTED OBJECT ROUTING

(71) Applicants: SONY CORPORATION, Tokyo (JP); SONY MEDIA CLOUD SERVICES LLC, Culver City, CA (US)

(72) Inventors: Ben Masek, Culver City, CA (US); Paul Kane, Culver City, CA (US); Brian Laske, Culver City, CA (US); Jeff Parker, Culver City, CA (US)

(73) Assignees: SONY CORPORATION, Tokyo (JP); SONY MEDIA CLOUD SERVICES LLC, Culver City, CA (US)

( * ) Notice: Subject to any disclaimer, the term of this patent is extended or adjusted under 35 U.S.C. 154(b) by 0 days.

(21) Appl. No.: 16/206,949

(22) Filed: Nov. 30, 2018

Related U.S. Application Data

(62) Division of application No. 14/804,174, filed on Jul. 20, 2015, now Pat. No. 10,177,907.

(51) Int. Cl.
*H04N 19/63* (2014.01)

(52) U.S. Cl.
CPC .................................. *H04N 19/63* (2014.11)

(58) Field of Classification Search
CPC .............................. G06F 16/51; H04N 19/63
See application file for complete search history.

(56) References Cited

U.S. PATENT DOCUMENTS

| 2006/0059174 A1* | 3/2006 | Mese ...................... G06F 9/445 |
| 2007/0250519 A1* | 10/2007 | Fineberg ............. G11B 27/002 |
| 2010/0161608 A1* | 6/2010 | Jain ....................... G06F 3/0641 |
| | | 707/737 |

* cited by examiner

*Primary Examiner* — Abiy Getachew
(74) *Attorney, Agent, or Firm* — Procopio, Cory, Hargreaves & Savitch LLP

(57) ABSTRACT

Retrieving a file using an index including: looking up the index which includes where a plurality of chunks of the file is stored; retrieving the plurality of chunks from a plurality of storage providers; and reassembling the a plurality of chunks to restore the file.

6 Claims, 6 Drawing Sheets

600

|  | SP 1 | SP 2 | SP 3 | SP 4 | SP 5 | SP 6 |
|---|---|---|---|---|---|---|
| Ex 1 | 1,2,4,6,7,8,9 | 3,4,5,7,8,9,10 | 1,2,3,5,6,10 | | | |
| Ex 2 | 1,4,7,8,9 | 2,3,5,9,10 | 1,5,6,7,8 | 2,3,4,6,10 | | |
| Ex 3 | 1,2,5,6 | 1,3,4,8 | 2,3,4,7 | 6,8,9,10 | 5,7,9,10 | |
| Ex 4 | 1,2,5,6,7,8,9 | 3,4,6,7,8,10 | 2,5,6,8,9,10 | 1,2,3,4,5,7 | 1,3,4,8,9,10 | |
| Ex 5 | 1,2,3,4,10 | 1,2,3,6,10 | 2,3,4,5,9 | 4,5,6,7,8 | 5,6,7,8,9 | 1,7,8,9,10 |
| Ex 6 | 1,2,3,4,5,6,10 | 1,2,3,4,6,10 | 2,3,4,5,7,8,9 | 1,4,5,6,7,8,9 | 2,5,6,7,8,9,10 | 1,3,7,8,9,10 | ns # DISTRIBUTED OBJECT ROUTING

The present application is a divisional application of co-pending U.S. patent application Ser. No. 14/804,174, filed Jul. 20, 2015. The disclosure of the above-referenced application is incorporated in its entirety herein.

BACKGROUND

Field of the Invention

The present invention relates to object routing, and more specifically, to distributed object routing.

Background

Digital data and files can be accessed and distributed across remotely located computer and communication networks to be played, stored, transported, and/or copied. Although the underlying technologies have many legal and useful applications, they are frequently used to produce illegal copies of the digital data and files, which can then be distributed over the Internet.

SUMMARY

The present invention provides for data storage which prevents unauthorized reconstruction of files by distributing a file as encrypted blocks across multiple storage providers. Distribution rules prevent any one storage provider from having enough blocks to reconstruct the file.

In one implementation, a method of storing a file to prevent unauthorized reconstruction of the file is disclosed. The method includes: generating an index of the file; partitioning the file into a plurality of chunks, wherein the index of the file includes an assigned routing path for each of the plurality of chunks; and routing each chunk into an assigned storage provider through the assigned routing path.

In another implementation, a method of retrieving a file using an index is disclosed. The method includes: looking up the index which includes where a plurality of chunks of the file is stored; retrieving the a plurality of chunks from a plurality of storage providers; and reassembling the a plurality of chunks to restore the file.

In another implementation, an apparatus of storing a file to prevent unauthorized reconstruction of the file is disclosed. The apparatus includes: means for generating an index of the file; means for partitioning the file into a plurality of chunks, wherein the index of the file includes an assigned routing path for each of the plurality of chunks; and means for routing each chunk into an assigned storage provider through the assigned routing path.

In another implementation, a method of streaming a file using an index is disclosed. The method includes: looking up the index of a proxy file of the file which includes where a plurality of chunks of the file is stored; retrieving the plurality of chunks of the proxy file from a plurality of storage providers; and reassembling and streaming the plurality of chunks of the proxy file.

Other features and advantages of the present invention should be apparent from the present description which illustrates, by way of example, aspects of the invention.

BRIEF DESCRIPTION OF THE DRAWINGS

The details of the present invention, both as to its structure and operation, may be gleaned in part by study of the appended further drawings, in which like reference numerals refer to like parts, and in which.

DETAILED DESCRIPTION

Figure 1:
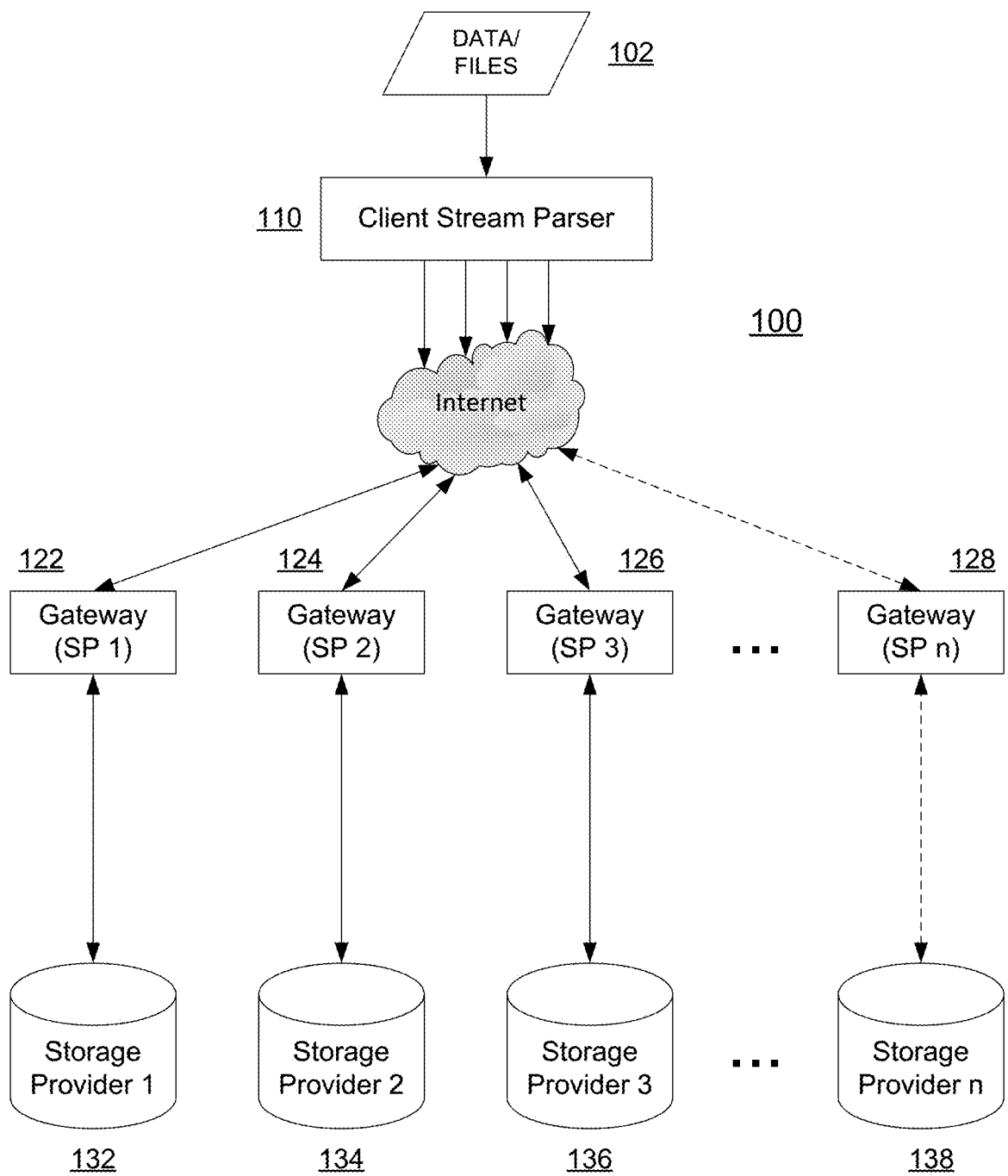
FIG. 1 is a functional block diagram of a distributed data storage and routing system in accordance with one implementation of the present disclosure.

Certain implementations as disclosed herein provide for storage and distribution of digital data to prevent unauthorized reconstruction of files by spreading a file as encrypted blocks or chunks across multiple storage locations. The distribution rules prevent any one storage location from having enough blocks to reconstruct the file. One implementation provides for storage of video and assets for video production. Further, various security mechanisms can also be used (key strategies, watermarks, etc.). Various combinations of local and remote storage can be used, including content distribution network (CDN), edge server, client-server and/or peer-to-peer mechanisms. Implementations may provide one or more benefits including: providing secure distributed storage that would eliminate (or at least substantially reduce) the risk of one (or a defined number) of storage providers from being able to re-create a full file; providing additional durability to file storage; and allowing for transcode of chunked media so as to allow proxy streaming.

One implementation includes system and method which increase the security of files stored on network resources. In this implementation, a file, such as an encrypted file storing a movie, is divided into blocks or chunks and the blocks/chunks are stored in different storage locations, such as storage servers connected to the Internet and operated by different storage providers ("SPs"). While a storage location may have one or more blocks, no one storage provider would have full access to the file or be able to reconstruct the full file. This spreading provides an additional hurdle for a hacker or other entity to access the content. In one implementation, the distributed blocks are used to protect the creation and streaming of a transcoded file.

In a further implementation, each storage provider is hosted in a cloud data center (e.g., AWS, Azure, Rackspace). Alternatively or in addition, on-premises data storage can be used for at least some blocks. In one example implementation, storage is striped across at least three SPs. Other implementations can use different minimum and maximum numbers of SPs. An index file indicates the locations of the blocks/chunks. In the example implementation, full restoration of a file would require at least two SPs. No one individual SP would have enough information to allow for a full restoration of a file. Similarly, in one transcoding implementation, transcoded chunks are distributed in a distributive manner similar to the file storage mechanism. In a further implementation, additional security measures include: encrypting the blocks and the index file using an SP and/or client keys; providing error correction and checksums for blocks; and storing blocks across at least two SPs.

In one particular implementation, a medical asset storage system storing medical records, patient data, and/or images is disclosed. In this implementation, distributing the files across multiple storage providers (SPs) provides security and durability for the data. Further, different security mechanisms (such as key strategies) can provide varying types or levels of security for different assets or data. For example, data used by a hospital, a doctor, an insurance provider, and a patient can all be stored in a distributed system with varying storage and key strategies to provide varying levels of data access and security, while all the assets can be associated with a common identifier for organization. In this way, not only can one SP not access all of a file, but one participant in the combined system (e.g., an insurance provider) can only access the appropriate assets in the system for a particular patient/insured.

FIG. 1 is a functional block diagram of a distributed data storage and routing system 100 in accordance with one implementation of the present disclosure. The distributed data storage and routing system 100 is configured to increase the security of data/files 102 stored on network resources. In particular implementation, the system 100 provides distributed storage that would substantially reduce the risk of one or more storage providers from being able to re-create a full file.

In the illustrated implementation of FIG. 1, the distributed data storage and routing system 100 includes a client stream parser 110, a plurality of gateways 122, 124, 126, 128 and a corresponding plurality of storage providers 132, 134, 136, 138. The client stream parser 110 is configured to receive a file, such as an encrypted file storing a movie, and divide the file into blocks or chunks to be stored in different storage locations. The divided blocks or chunks are then distributed through a network (e.g., the Internet) to the plurality of gateways 122, 124, 126, 128 to be stored by the plurality of storage providers 132, 134, 136, 138. All objects (e.g., block/chunks) stored would be encrypted via a storage provider encryption, and could also be encrypted based on a client-specified key. The locations of the chunks are saved in an index file which can also be encrypted with the client-specified key.

The plurality of storage providers 132, 134, 136, 138 ensures integrity and availability of the data/files by providing various error correction checks. For example, each storage provider 132, 134, 136, or 138 provides error correction checks such as checksums to verify the integrity of the chunks. In another example, the distributed data storage and routing system 100 provides parity of data across at least two storage providers (up to m copies per chunked file), while each storage provider provides its own mechanism for durability. At a minimum, the durability rating would be twice that of the least durable storage provider.

The system 100 also enables transcoding of chunked data to allow proxy streaming. Further, the distributed data storage and routing system 100 provides various primary-end-user-to-file interactions including storing the file (along with metadata and/or attributes), retrieving the file, or streaming the file. Each of the interactions is described in detail in flowcharts 300, 400, 500 illustrated in FIGS. 3, 4, and 5, respectively.

Figure 2:
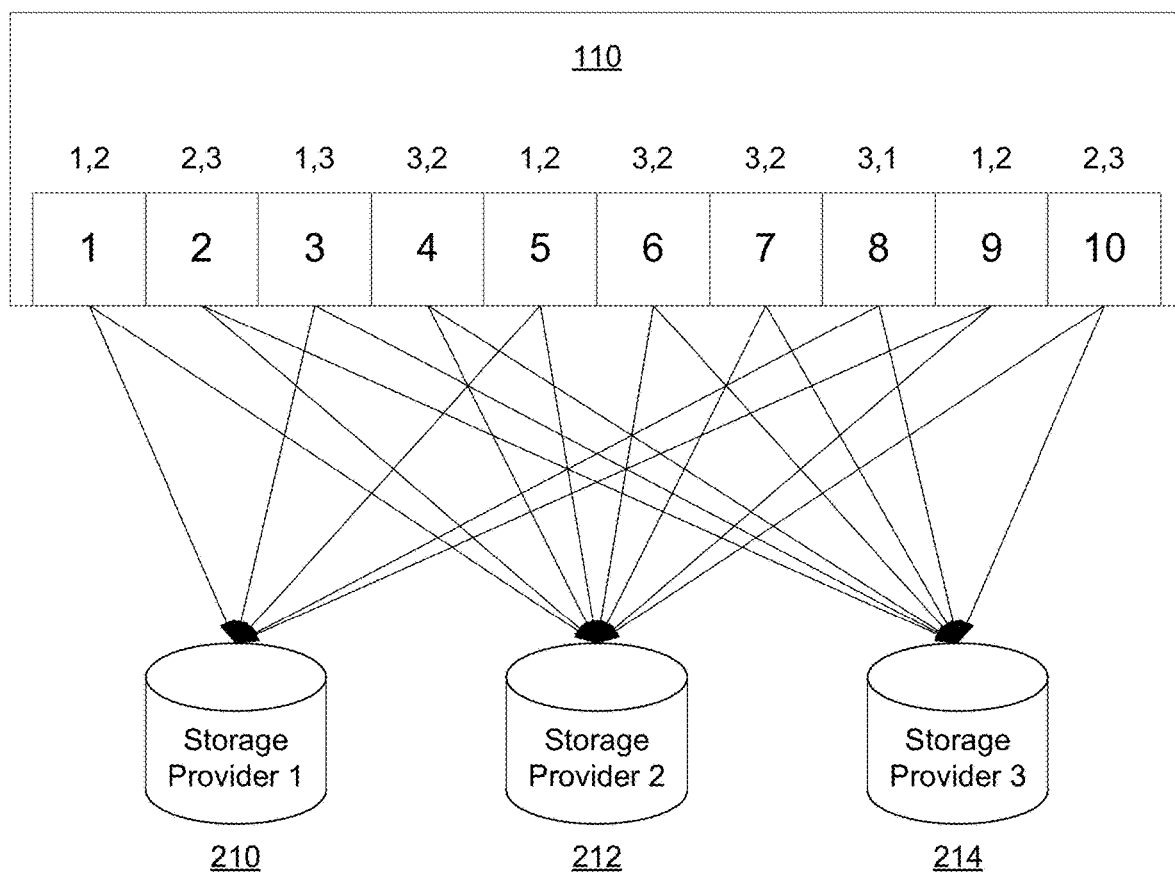
FIG. 2 is an example functional diagram of the client stream parser in accordance with one implementation of the present disclosure.

FIG. 2 is an example functional diagram of the client stream parser 110 in accordance with one implementation of the present disclosure. In the illustrated implementation of FIG. 2, a file is divided into 10 chunked elements (labeled 1 through 10). The client stream parser 110 provides secure, trackable, and randomized indexing. For example, each chunked element has an indexed start and stop position within a given file (not shown).

In one implementation, up to m copies per chunked element are created, and the copies are placed across up to n storage providers. In the illustrated example, two copies (m=2) of each chunked element are placed across three storage providers 210, 212, 214 (n=3). For example, chunked element 1 is placed in storage providers 1 and 2. The placement of other chunked elements includes: chunked element 2 in SP 2 and 3; chunked element 3 in SP 1 and 3; chunked element 4 in SP 3 and 2; chunked element 5 in SP 1 and 2; chunked element 6 in SP 3 and 2; chunked element 7 in SP 3 and 2; chunked element 8 in SP 3 and 1; chunked element 9 in SP 1 and 2; and chunked element 10 in SP 2 and 3.

The client stream parser 110 generates an index file including information such as which chunked elements (with start and stop positions) are stored in which storage providers. In one implementation, the index file is protected via encryption, requiring two keys to access. One key would be held by the system 100, the other by the client. The index file can be parsed and distributed across multiple storage providers, in a manner similar to the parsing and distribution of the data/file as described above. For example, a process may include partitioning the index file into chunks of the index, generating indexed elements of the chunks of the index, and routing the chunks of the index to assigned storage providers according to the indexed elements.

Figure 3:
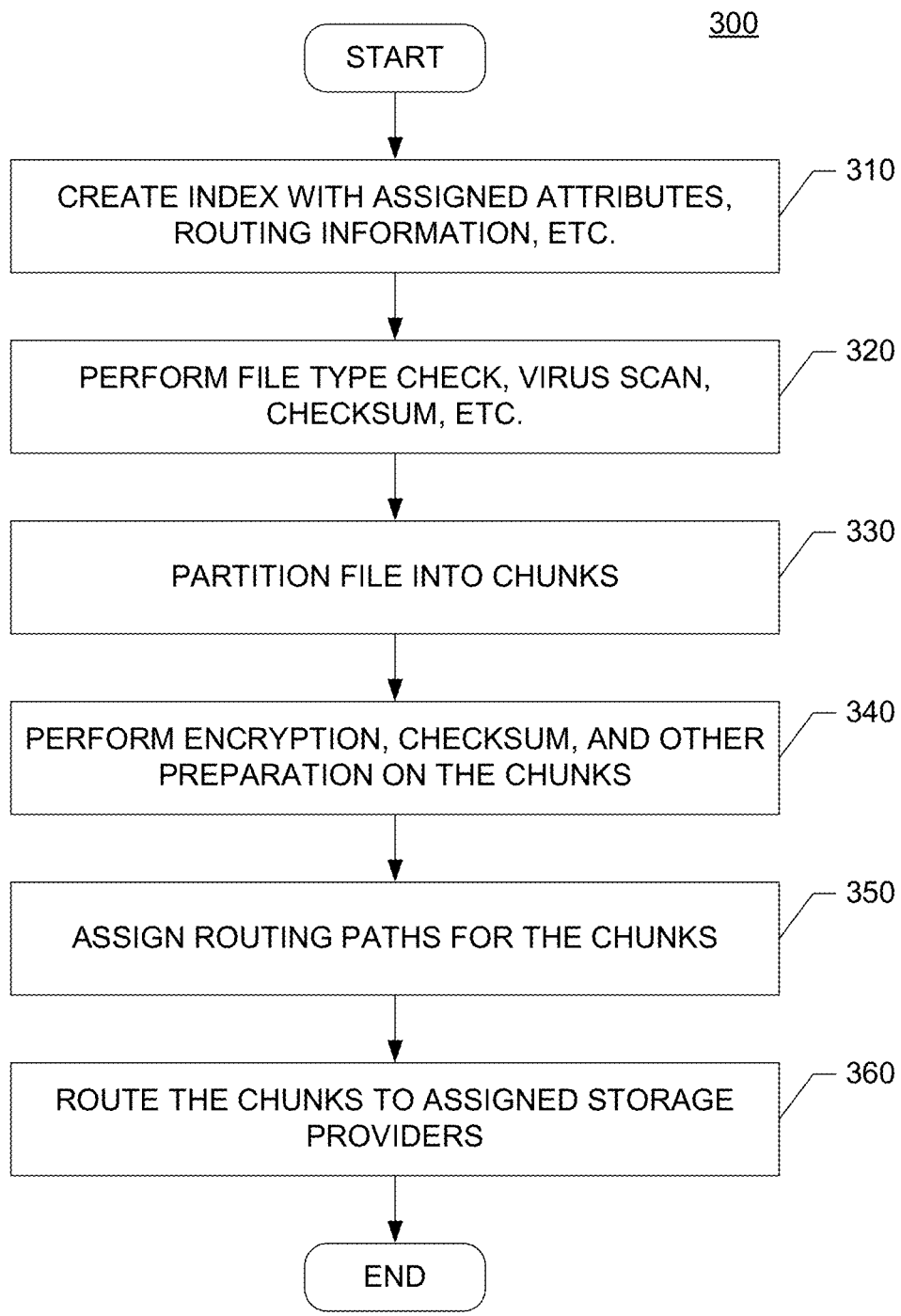
FIG. 3 is a flow diagram illustrating a method of storing a file (or data) to prevent unauthorized reconstruction of the file in accordance with one implementation of the present disclosure.

FIG. 3 is a flow diagram 300 illustrating a method of storing a file (or data) to prevent unauthorized reconstruction of the file in accordance with one implementation of the present disclosure. In one implementation, this is achieved by spreading the file as encrypted blocks or chunks across multiple storage locations.

In the illustrated implementation of FIG. 3, the method includes receiving a file and creating an index, at step 310, with assigned attributes and routing information. File type check, virus scan, and checksum are performed on the file, at step 320. The file is then partitioned into chunks, at step 330. In one implementation, the index is also partitioned into chunks. At step 340, encryption, checksum, and other preparation are performed on the chunks. The prepared chunks are assigned routing paths, at step 350, and the chunks are routed to the assigned storage providers, at step 360. In one implementation, the total number (n) of storage providers in the system 100 must be greater than two.

Figure 4:
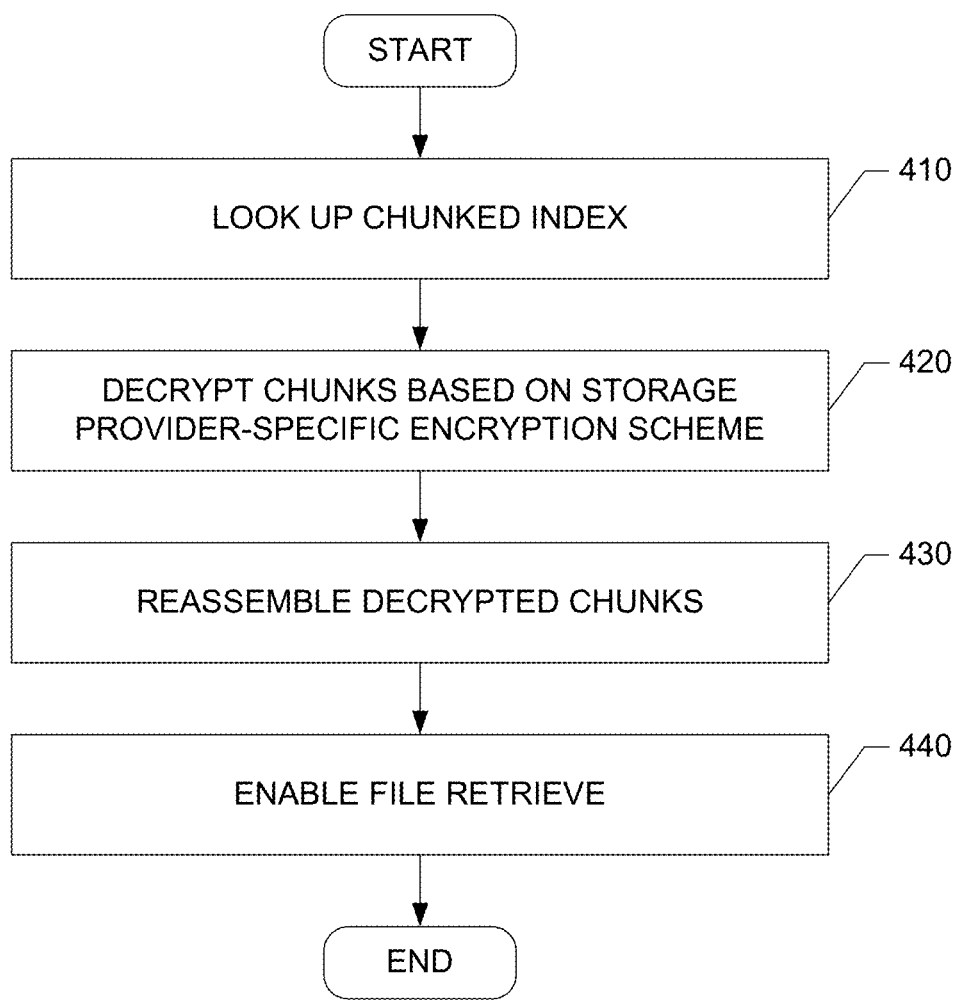
FIG. 4 is a flow diagram illustrating a method for retrieving a file (or data) that is "distributively" stored in accordance with one implementation of the present disclosure.

FIG. 4 is a flow diagram 400 illustrating a method for retrieving a file (or data) that is "distributively" stored in accordance with one implementation of the present disclosure. In the illustrated implementation of FIG. 4, the method includes looking up the chunked index, at step 410, and decrypting the chunks based on storage provider-specific encryption scheme, at step 420. The decrypted chunks are then reassembled, at step 430, and the file retrieve process is enabled, at step 440. In one implementation, a full restoration of a file requires at least m storage providers, where m is greater than one (i.e., no one storage provider contains enough information to allow for a full restoration of a file), but is less than or equal to n−1 (where n is the total number of storage providers). This can be expressed as 1<m≤n−1.

Figure 5:
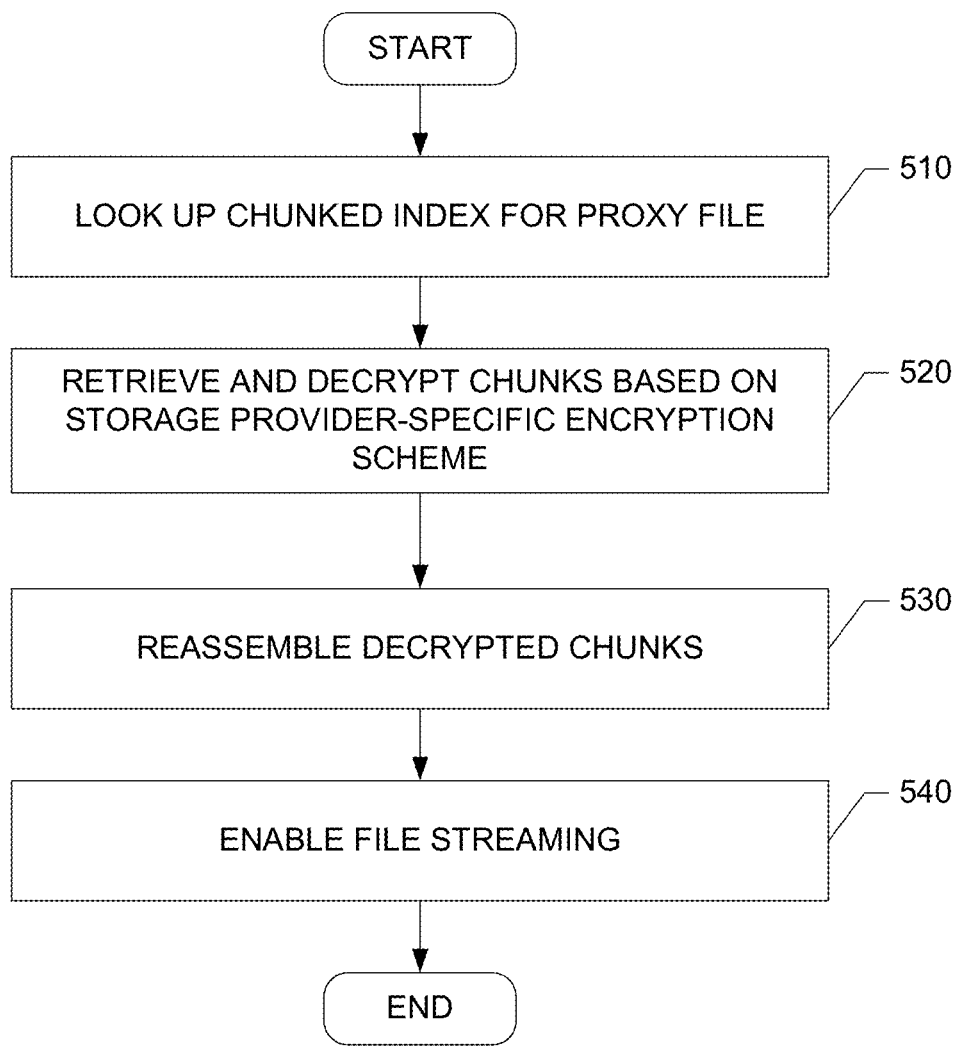
FIG. 5 is a flow diagram illustrating a method for streaming a file (or data) that is "distributively" stored in accordance with one implementation of the present disclosure.

FIG. 5 is a flow diagram 500 illustrating a method for streaming a file (or data) that is "distributively" stored in accordance with one implementation of the present disclosure. In the illustrated implementation of FIG. 5, the method includes looking up the chunked index for a proxy file of the file, at step 510, and retrieving and decrypting the chunks based on storage provider-specific encryption scheme, at step 520. The decrypted chunks are then reassembled, at step 530, and the file streaming process is enabled, at step 540.

Figures 6, 7:
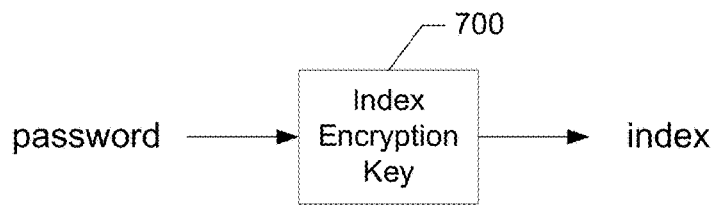
FIG. 6 shows example distributions of chunks over multiple storage providers.
FIG. 7 shows an encryption key management strategy in which an index file is encrypted using a strong encryption key.

FIG. 6 shows example distributions 600 of chunks over multiple storage providers. In the examples described below, following definitions apply: (1) total number of storage providers (n); (2) minimum number of storage providers required to retrieve a file (m); (3) minimum number of copies that need to be made for each chunk (p); and (4) number of storage providers that can be lost while providing a full restoration of a file (q).

In example 1, ten chunks are distributed over three storage providers with n=3, p=2, m=2, and q=1. In this example, SP1 stores: chunks 1, 2, 4, 6, 7, 8, 9; SP2 stores chunks 3, 4, 5, 7, 8, 9, 10; and SP3 stores chunks 1, 2, 3, 5, 6, 10. To restore the full ten chunk file, a combination SP1 and SP2, SP1 and SP3, or SP2 and SP3 is needed. Thus, each of those three two-storage provider pairs indicates that one storage provider can be dropped. Therefore, it can be seen that there are a total of three storage providers (i.e., n=3), two copies of each chunk are made (i.e., p=2), at least two storage providers are required to retrieve the file (i.e., m=2), and at least one storage provider can be lost yet provide a full restoration of the file (i.e., q=1).

In example 2, ten chunks are distributed over four storage providers with n=4, p=3, m=3, and q=1. In this example, SP1 stores: chunks 1, 4, 7, 8, 9; SP2 stores chunks 2, 3, 5, 9, 10; SP3 stores chunks 1, 5, 6, 7, 8; and SP 4 stores chunks 2, 3, 4, 6, 10. To restore the full ten chunk file, a combination SP1/SP2/SP3, SP1/SP2/SP4, SP1/SP3/SP4, or SP2/SP3/SP4 is needed. Thus, each of those four three-SP combinations indicates that one storage provider can be dropped. Therefore, it can be seen that there are a total of four storage providers (i.e., n=4), three copies of each chunk are made (i.e., p=3), at least three storage providers are required to retrieve the file (i.e., m=3), and at least one storage provider can be lost yet provide a full restoration of the file (i.e., q=1).

In example 3, ten chunks are distributed over five storage providers with n=5, p=2, m=4, and q=1. In this example, SP1 stores: chunks 1, 2, 5, 6; SP2 stores chunks 1, 3, 4, 8; SP3 stores chunks 2, 3, 4, 7; SP4 stores chunks 6, 8, 9, 1; and SP5 stores chunks 5, 7, 9, 10. To restore the full ten chunk file, a combination SP1/SP2/SP3/SP4, SP1/SP2/SP3/SP5, SP1/SP2/SP4/SP5, SP1/SP3/SP4/SP5, or SP2/SP3/SP4/SP5 is needed. Thus, each of those five four-SP combinations indicates that one storage provider can be dropped. Therefore, it can be seen that there are a total of five storage providers (i.e., n=5), two copies of each chunk are made (i.e., p=2), at least four storage providers are required to retrieve the file (i.e., m=4), and at least one storage provider can be lost yet provide a full restoration of the file (i.e., q=1).

In example 4, ten chunks are distributed over five storage providers with n=5, p=3, m=3, and q=2. In this example, SP1 stores: chunks 1, 2, 5, 6, 7, 8, 9; SP2 stores chunks 3, 4, 6, 7, 8, 10; SP3 stores chunks 2, 5, 6, 8, 9, 10; SP4 stores chunks 1, 2, 3, 4, 5, 7; and SP5 stores chunks 1, 3, 4, 8, 9, 10. To restore the full ten chunk file, a combination SP1/SP2/SP3, SP1/SP2/SP4, SP1/SP2/SP5, SP1/SP3/SP4, SP1/SP3/SP5, SP1/SP4/SP5, SP2/SP3/SP4, SP2/SP3/SP5, SP2/SP4/SP5, or SP3/SP4/SP5 is needed. Thus, each of those ten three-SP combinations indicates that two storage providers can be dropped. Therefore, it can be seen that there are a total of five storage providers (i.e., n=5), three copies of each chunk are made (i.e., p=3), at least three storage providers are required to retrieve the file (i.e., m=3), and at least two storage providers can be lost yet provide a full restoration of the file (i.e., q=2).

In example 5, ten chunks are distributed over six storage providers with n=6, p=3, m=4, and q=2. In this example, SP1 stores: chunks 1, 2, 3, 4, 10; SP2 stores chunks 1, 2, 3, 6, 10; SP3 stores chunks 2, 3, 4, 5, 9; SP4 stores chunks 4, 5, 6, 7, 8; SP5 stores chunks 5, 6, 7, 8, 9; and SP6 stores chunks 1, 7, 8, 9, 10. To restore the full ten chunk file, a combination SP1/SP2/SP3/SP4, SP1/SP2/SP3/SP5, SP1/SP2/SP3/SP6, SP1/SP3/SP4/SP5, SP1/SP3/SP4/SP6, SP1/SP4/SP5/SP6, SP2/SP3/SP4/SP5, SP2/SP3/SP4/SP6, SP2/SP4/SP5/SP6, SP2/SP3/SP5/SP6, SP3/SP4/SP5/SP6, SP1/SP2/SP4/SP5, SP1/SP2/SP4/SP6, SP1/SP2/SP5/SP6, or SP1/SP3/SP5/SP6 is needed. Thus, each of those fifteen four-SP combinations indicates that two storage providers can be dropped. Therefore, it can be seen that there are a total of six storage providers (i.e., n=6), three copies of each chunk are made (i.e., p=3), at least four storage providers are required to retrieve the file (i.e., m=4), and at least two storage providers can be lost yet provide a full restoration of the file (i.e., q=2).

In example 6, ten chunks are distributed over six storage providers with n=6, p=4, m=3, and q=3. In this example, SP1 stores: chunks 1, 2, 3, 4, 5, 6, 10; SP2 stores chunks 1, 2, 3, 4, 6, 10; SP3 stores chunks 2, 3, 4, 5, 7, 8, 9; SP4 stores chunks 1, 4, 5, 6, 7, 8, 9; SP5 stores chunks 2, 5, 6, 7, 8, 9, 10; and SP6 stores chunks 1, 3, 7, 8, 9, 10. To restore the full ten chunk file, a combination SP1/SP2/SP3, SP1/SP2/SP4, SP1/SP2/SP5, SP1/SP2/SP6, SP1/SP3/SP4, SP1/SP3/SP5, SP1/SP3/SP6, SP1/SP4/SP5, SP1/SP4/SP6, SP1/SP5/SP6, SP2/SP3/SP4, SP2/SP3/SP5, SP2/SP3/SP6, SP2/SP4/SP5, SP2/SP4/SP6, SP2/SP5/SP6, SP3/SP4/SP5, SP3/SP4/SP6, or SP4/SP5/SP6 is needed. Thus, each of those nineteen three-SP combinations indicates that three storage providers can be dropped. Therefore, it can be seen that there are a total of six storage providers (i.e., n=6), four copies of each chunk are made (i.e., p=4), at least three storage providers are required to retrieve the file (i.e., m=3), and at least three storage providers can be lost yet provide a full restoration of the file (i.e., q=3).

FIG. 7 shows an encryption key management strategy in which an index file is encrypted using a strong encryption key. In the illustrated implementation, a unique Index Encryption Key 700 is generated for each user. The Index Encryption Key 700 is encrypted using a password that is managed by the user. Thus, the user provides their password whenever uploading or downloading a file.

The foregoing methods, apparatus, and associated non-transitory storage medium are susceptible to many variations. Additionally, for clear and brief description, many descriptions of the methods, apparatus, and non-transitory storage medium have been simplified. Many descriptions use terminology and structures of specific standards. However, the disclosed methods, apparatus, and non-transitory storage medium are more broadly applicable.

Those of skill in the art will appreciate that the various illustrative logical blocks, modules, units, and algorithm steps described in connection with the implementations disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The steps of a method and the processes of a block or module described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. For example, instead of or in addition to files, game objects or other types of virtual objects can be used. Accordingly, the techniques are not limited to the specific examples described above. Thus, it is to be understood that the description and drawings presented herein represent a presently preferred implementation of the invention and are therefore representative of the subject matter that is broadly contemplated by the present invention. It is further understood that the scope of the present invention fully encompasses other implementations that may become obvious to those skilled in the art and that the scope of the present invention is accordingly limited by nothing other than the appended claims.

What is claimed is:

1. A method of retrieving a file using an index, the method comprising:
   retrieving and reassembling the file partitioned into a plurality of chunks to prevent unauthorized reconstruction of the file, the retrieving and reassembling comprising:
   retrieving the index of the file which includes where the plurality of chunks of the file is stored;
   retrieving the plurality of chunks from a plurality of storage providers,
   wherein each chunk of the plurality of chunks was assigned to and stored in at least two of the plurality of storage providers using the index of file such that the file can be reconstructed with less than a total number of the plurality of storage providers; and
   reassembling the plurality of chunks to restore the file with chunks retrieved from less than the total number of the plurality of storage providers,
   wherein duplicate chunks of the plurality of chunks are discarded.

2. The method of claim 1, further comprising decrypting each chunk of the plurality of chunks based on a storage provider-specific encryption scheme.

3. The method of claim 1, wherein the total number of the plurality of storage providers used to retrieve the plurality of chunks of the file is greater than two.

4. A method of streaming a file using an index, the method comprising:
   retrieving the index of a proxy file of the file,
   wherein the index of the proxy file includes where a plurality of chunks of the file is stored;
   retrieving and decrypting the plurality of chunks of the file from a plurality of storage providers using the index of he proxy file,
   wherein each chunk of the plurality of chunks was assigned to and stored in at least two of the plurality of storage providers such that the file can be reconstructed with less than a total number of the plurality of storage providers;
   reassembling the plurality of chunks of the file with chunks retrieved from less than the total number of the plurality of storage providers; and
   streaming the plurality of chunks of the file.

5. The method of claim 4, further comprising decrypting each chunk of the plurality of chunks based on a storage provider-specific encryption scheme.

6. The method of claim 4, wherein the total number of the plurality of storage providers used to retrieve the plurality of chunks of the file is greater than two.

* * * * *